(12) United States Patent
Hammerschmidt et al.

(10) Patent No.: US 9,444,613 B2
(45) Date of Patent: *Sep. 13, 2016

(54) SENSOR, CONTROL UNIT AND METHOD TO COMMUNICATE BETWEEN SENSORS AND CONTROL UNITS

(71) Applicant: INFINEON TECHNOLOGIES AG, Neubiberg (DE)

(72) Inventors: Dirk Hammerschmidt, Villach (AT); Friedrich Rasbornig, Klagenfurt (AT); Bernhard Schaffer, Villach (AT); Michael Strasser, Villach (AT)

(73) Assignee: Infineon Technologies AG, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/612,227

(22) Filed: Feb. 2, 2015

(65) Prior Publication Data

US 2015/0146831 A1   May 28, 2015

Related U.S. Application Data

(63) Continuation of application No. 12/242,951, filed on Oct. 1, 2008, now Pat. No. 8,948,280, which is a continuation-in-part of application No. 11/838,475, filed on Aug. 14, 2007, now Pat. No. 8,183,982.

(30) Foreign Application Priority Data

Jul. 3, 2008   (DE) .................. 10 2008 031 498

(51) Int. Cl.
*H04L 7/02* (2006.01)
*H04L 7/027* (2006.01)
*H04L 7/10* (2006.01)
*H04L 25/49* (2006.01)

(52) U.S. Cl.
CPC ............ *H04L 7/0278* (2013.01); *H04L 7/10* (2013.01); *H04L 25/4902* (2013.01)

(58) Field of Classification Search
CPC .................................................... H04L 7/0331
USPC ....................................................... 375/360
See application file for complete search history.

(56) References Cited

U.S. PATENT DOCUMENTS

| | | | | |
|---|---|---|---|---|
| 5,973,613 A * | 10/1999 | Reis et al. | .................. | 340/7.23 |
| 6,055,145 A * | 4/2000 | Lagree et al. | .............. | 361/93.1 |
| 6,088,830 A * | 7/2000 | Blomgren et al. | ............ | 714/814 |
| 6,344,906 B1 * | 2/2002 | Gatto et al. | .................. | 358/443 |
| 6,925,111 B2 * | 8/2005 | Koga | .............................. | 375/219 |
| 7,113,213 B2 * | 9/2006 | Matsunaga et al. | .......... | 348/308 |
| 7,275,174 B2 * | 9/2007 | Cheung et al. | ............... | 713/500 |
| 7,659,716 B2 * | 2/2010 | Nishikawa | ..................... | 324/244 |
| 7,930,126 B2 * | 4/2011 | Frese et al. | .................... | 702/104 |
| 8,009,027 B2 * | 8/2011 | Thomas et al. | ................ | 340/447 |
| 8,018,954 B2 * | 9/2011 | Jamieson et al. | ............. | 370/401 |
| 8,050,881 B1 * | 11/2011 | Yeung et al. | ................... | 702/89 |

(Continued)

*Primary Examiner* — Santiago Garcia
(74) *Attorney, Agent, or Firm* — Schiff Hardin LLP

(57) ABSTRACT

A sensor may include a clock generator configured to generate a clock. A receiver may be configured to receive signals from a control unit, and a transmitter they be configured to send signals to the control unit. In one implementation, the transmitter is configured to send a synchronization signal based on the clock. A period between a first edge and a second edge of the synchronization signal may be dependent on the clock and both edges are either rising or falling.

19 Claims, 3 Drawing Sheets

(56) References Cited

U.S. PATENT DOCUMENTS

| | | | |
|---|---|---|---|
| 8,400,292 B2* | 3/2013 | Kummetz | 340/517 |
| 2003/0227987 A1* | 12/2003 | Poletto et al. | 375/360 |
| 2004/0255680 A1* | 12/2004 | Ortega et al. | 73/649 |
| 2005/0091428 A1* | 4/2005 | Matsumoto et al. | 710/52 |
| 2005/0184229 A1* | 8/2005 | Maeda | 250/234 |
| 2005/0196059 A1* | 9/2005 | Inoue et al. | 382/240 |
| 2005/0212932 A1* | 9/2005 | Steimle et al. | 348/246 |
| 2006/0082451 A1* | 4/2006 | Shaw | 340/449 |
| 2006/0153041 A1* | 7/2006 | Miyashita et al. | 369/59.22 |
| 2006/0161763 A1* | 7/2006 | Ito et al. | 712/241 |
| 2006/0201931 A1* | 9/2006 | Lee et al. | 219/497 |
| 2006/0220815 A1* | 10/2006 | Thomas | 340/447 |
| 2006/0254369 A1* | 11/2006 | Yoon et al. | 73/862.041 |
| 2007/0270114 A1* | 11/2007 | Kesler et al. | 455/187.1 |
| 2007/0279203 A1* | 12/2007 | Thomas et al. | 340/447 |
| 2008/0048772 A1* | 2/2008 | Nishikawa | 327/544 |
| 2008/0199047 A1* | 8/2008 | Kuo et al. | 382/106 |
| 2008/0204826 A1* | 8/2008 | Kimura | 358/497 |
| 2008/0284585 A1* | 11/2008 | Schweitzer et al. | 340/539.3 |
| 2008/0284883 A1* | 11/2008 | Asahi | 348/295 |
| 2009/0058338 A1* | 3/2009 | Takeuchi | 318/400.13 |
| 2009/0138748 A1* | 5/2009 | Kim et al. | 713/503 |
| 2009/0167521 A1* | 7/2009 | Edwards et al. | 340/539.1 |
| 2009/0310727 A1* | 12/2009 | Rouis | 375/360 |
| 2009/0312959 A1* | 12/2009 | Borman | 702/41 |
| 2010/0045471 A1* | 2/2010 | Meyers | 340/605 |
| 2011/0074843 A1* | 3/2011 | Kusaka | 347/7 |
| 2012/0170413 A1* | 7/2012 | Fisher et al. | 367/127 |

* cited by examiner

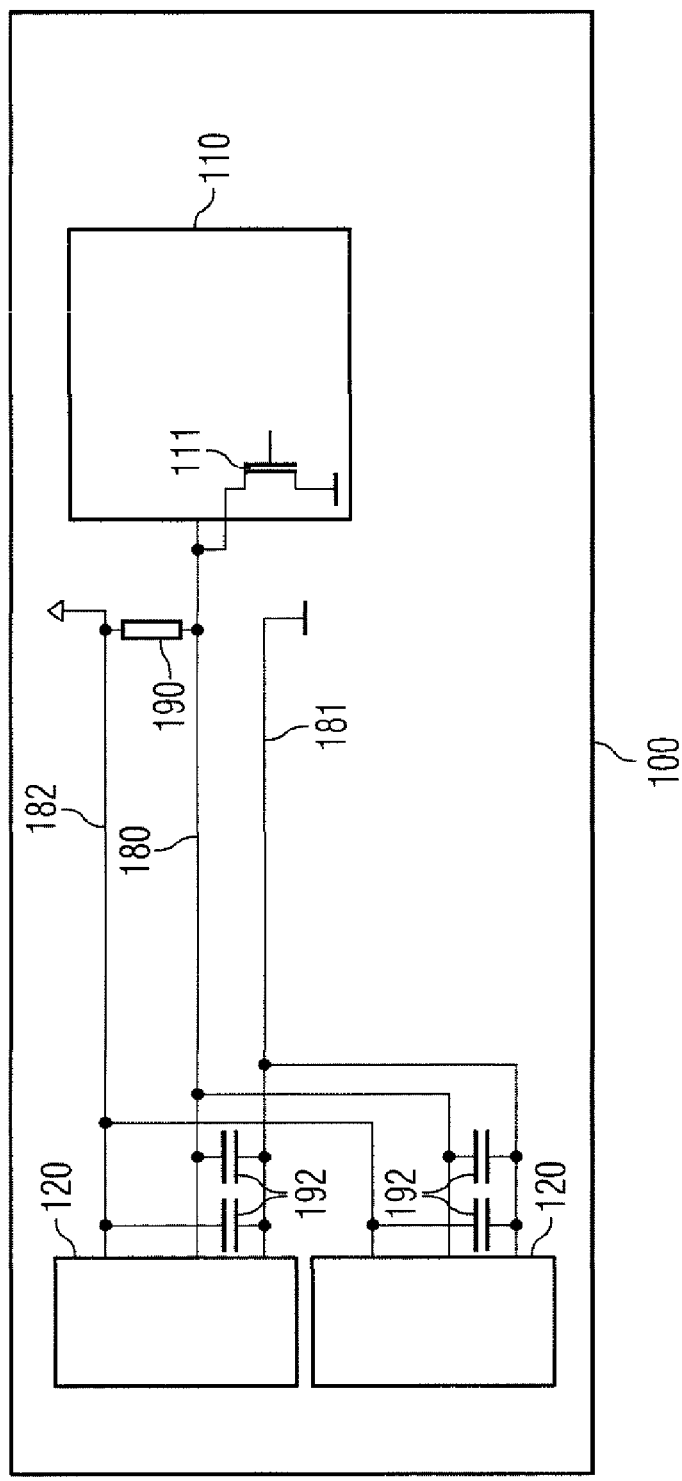

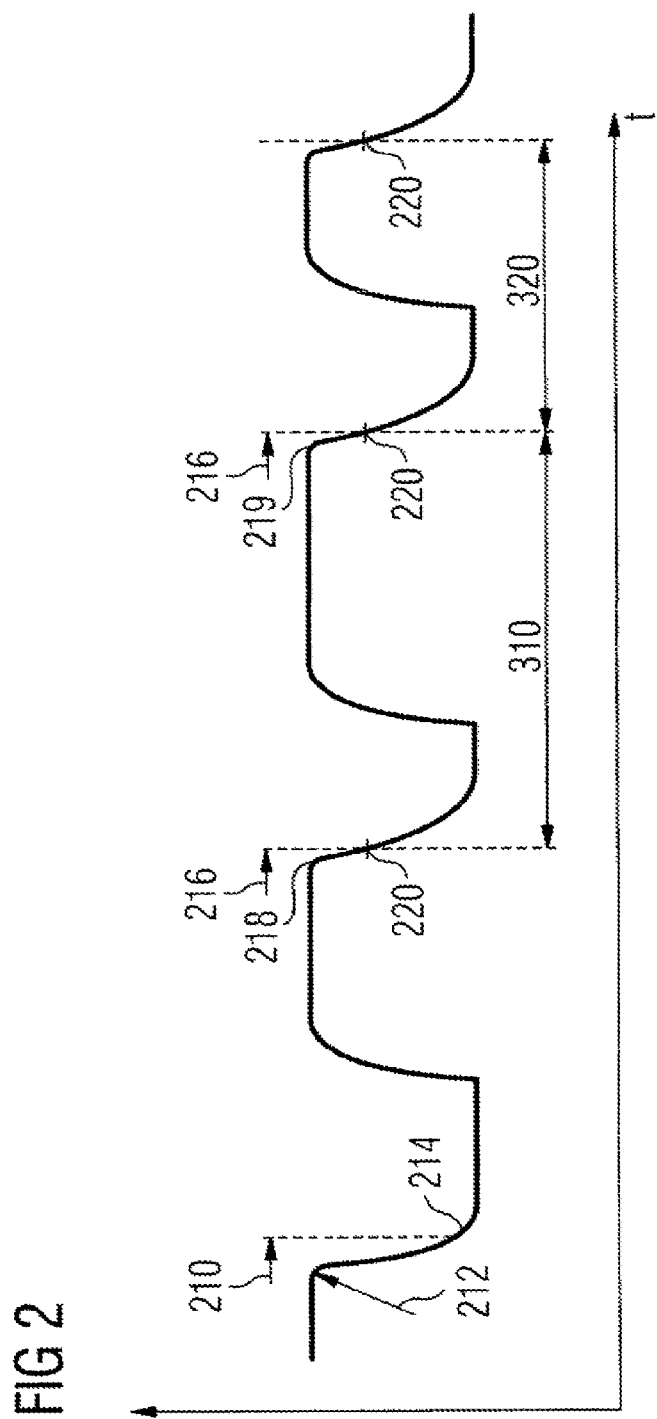

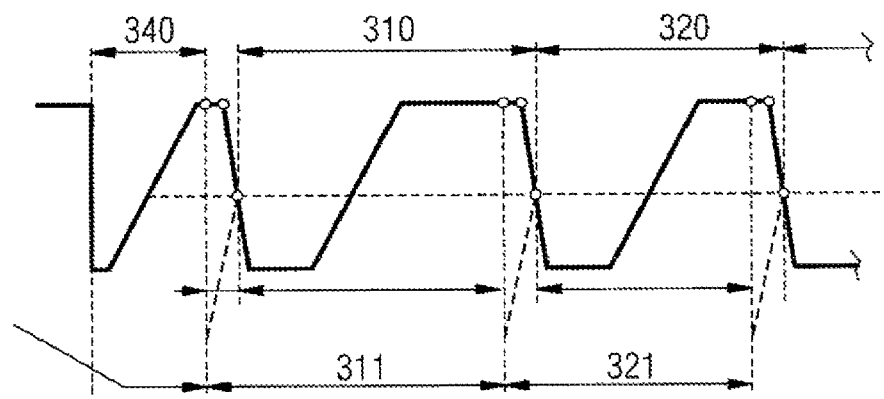
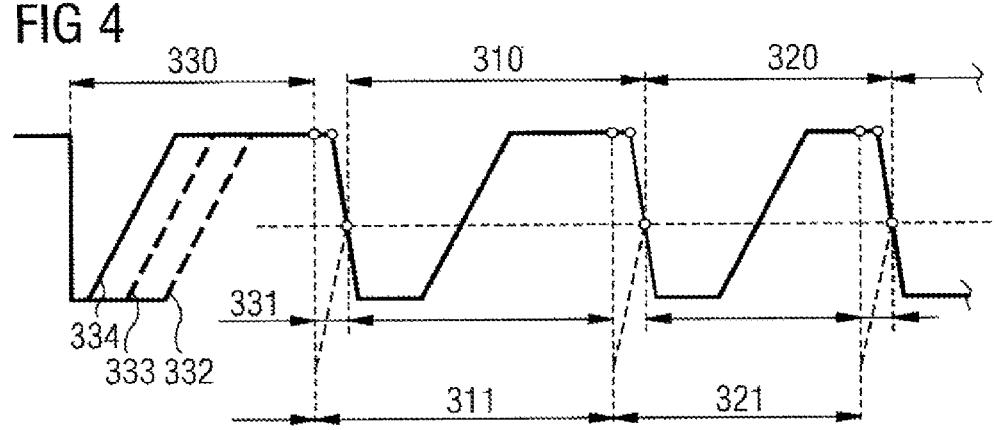
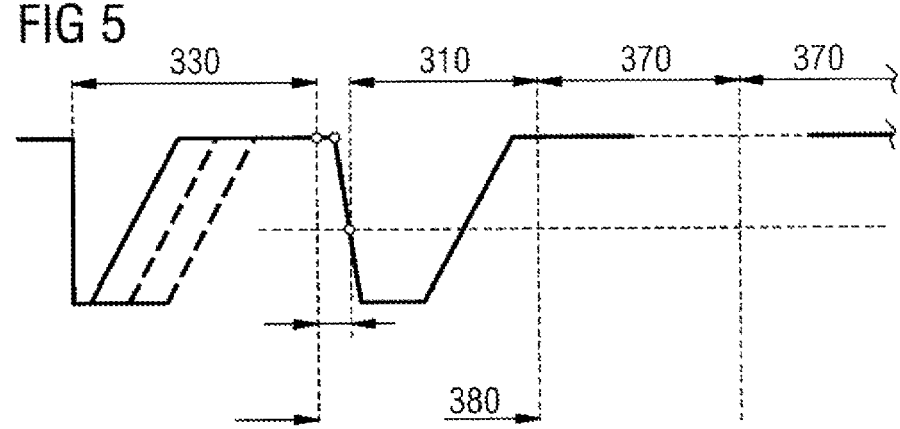

US 9,444,613 B2

SENSOR, CONTROL UNIT AND METHOD TO COMMUNICATE BETWEEN SENSORS AND CONTROL UNITS

REFERENCE TO RELATED APPLICATIONS

This application is a continuation of U.S. patent application Ser. No. 12/242,951, which was filed on Oct. 1, 2008. U.S. patent application Ser. No. 12/242,951 is a continuation in part of U.S. patent application Ser. No. 11/838,475, now U.S. Pat. No. 8,183,982 and which was filed on Aug. 14, 2007. The entire contents of the indicated prior filed U.S. patent applications are hereby incorporated herein by reference.

FIELD OF THE INVENTION

The present invention relates to sensors, control units and methods to communicate between sensors and control units.

BACKGROUND

Digital transmission of data requires a common time base for decoding the data. This determines when the data are valid in a receiver and can be sampled. If, in the case of message-oriented transmission, data packets are intended to be transmitted only upon request, the starting time for the transmission is required. This requires a further signal line if this information is not simultaneously encoded by means of the clock information. In embedded systems, this is achieved by means of a common system clock and selection lines which address data sources specifically.

In decentralized systems, multiwire buses are used, e.g. SPI (Serial Peripheral Interface), which is supported by many microcontrollers. In this case, the clock for the data transmission is sent on a separate line for the purpose of bit-synchronous data transmission. A selection line indicates the start and the end of the data transmission.

If the number of lines needs to be reduced for reasons of cost, the transmitter's clock and the starter of a transmission need to be encoded in the data to be transmitted themselves in order to allow reliable decoding in a receiver.

Economizing on external decoding hardware which needs to be used in addition to a microcontroller is an important cost factor which needs to be taken into account.

SUMMARY

A sensor comprises a clock generator configured to generate a clock, a receiver configured to receive signals from a control unit; and a transmitter configured to send signals to the control unit. The transmitter is configured to send a synchronization signal based on the clock, and wherein a period between a first edge and a second edge of the synchronization signal is dependent on the clock and both edges are either rising or falling.

BRIEF DESCRIPTION OF THE DRAWINGS

FIG. 1 shows an exemplary embodiment of a control unit which is connected to two sensors by means of a bus line.
FIGS. 2 to 5 show signals on a bus line.

DETAILED DESCRIPTION

The present invention is based on the object of providing a simple and inexpensive method and inexpensive components for clock generation which allow a control unit to interchange data with one or more sensors.

By way of example, a system may have a control unit and at least one sensor. Control units may be microprocessors whose technology is set up to combine as many logic possible on one integrated circuit. By way of example, a sensor, for example a pressure sensor, a Hall sensor or an acceleration sensor, may be constructed using a semiconductor technology which may be oriented more closely to the needs of the sensor per se. The technology which is used to produce the sensors normally has a much lower packing density than the technology which is used to produce a microprocessor. It is therefore advantageous if the complexity for a communication link between one or more sensors and a controller is such that the complexity for this communication is as low as possible in the sensor. The communication link used may be bus lines. A bus line comprises at least one wire which connects at least two subscribers, a control unit and a sensor. In this connection, it is advantageous if the number of bus lines is reduced. The control unit and at least one sensor can be powered by the same supply voltage, which can be provided by a car battery, for example. The logic states on a bus line can then be stipulated by connecting the bus line either to a high potential of the supply voltage or to a low potential of the supply voltage. A sensor may have a local clock generator whose clock can be generated using an RC oscillator, for example. If the local clock generator has an internal RC oscillator, the local clock generator has a higher or lower tolerance, depending on the design. Trimming to reduce the tolerance of the local oscillator increases the costs for the sensor significantly. Other designs for the local clock generator, such as inverter delay lines, can also be produced only with high tolerances.

The transmitted clock of the sensor may be a multiple of the internal clock of the sensor.

The control unit can store the clock as a clock value. If the internal clock of the control unit is higher than the clock of a sensor, the clock value can be stored as the quotient of the sensor clock and the internal clock of the control unit, for example.

The control unit can request data by sending a wake-up signal. If only one sensor is connected to the control unit 20 by means of a bus line, a short wake-up signal from the control unit is sufficient to request data.

If only one sensor is connected to the control unit by means of a bus line, the control unit can send a modulated wake-up 25 signal for configuring the sensor to the transmitter. Such a wake-up signal can be used to change over the measurement range of the sensor, for example, or to request another data record, for example. The wake-up signal may be PWM modulated.

If a plurality of sensors are connected to the control unit by means of a bus line, communication first requires a sensor to be selected which can send signals to a bus line. The control unit can request data and select a sensor by sending an address signal. The address signal may be PWM modulated.

The address signal may be in a form such that the sensors are woken up thereby and there is no need for any further dedicated wake-up signal.

The control unit can use the address signal for configuration if the address signal is outside the address space of the sensors, that is to say that no sensor is selected by means of this address. Such an address signal can be used to change over the measurement range of the sensor, for example, or to request another data record, for example. The sensor may be in a form such that this address signal is identified as a configuration command. Depending on whether a sensor is designed to identify the address signal as a configuration command, one or more or all sensors can be addressed by the address signal.

The sensor can send the synchronization signal following reception of an address signal or of a wake-up signal.

The communication between the control unit and a sensor can be set up by virtue of the control unit first of all sending a signal which is used to address a sensor. By way of example, the signal may be a pulse which has a particular length. In this case, the address of the sensor is encoded as a pulse length. The sensor uses its local clock generator to measure the pulse length, and the sensor whose programme pattern corresponds to the pulse length is addressed. After a particular waiting time, the selected sensor sends a synchronization signal. The length of the synchronization signal is dependent on the frequency of the selected sensor's local clock generator. The length of the synchronization pulse may be a single or a multiple of the period of the local clock generator. The multiplicity can be stipulated by hard-wiring or by a value in an EEPROM store in a sensor, for example. By way of example, the synchronization signal may be in a form such that the sensor first of all changes the bus line from a high to a low state in order to enable the bus line again after a certain waiting time, so that the bus line changes from the low state to the high state. The synchronization signal is completed by virtue of the sensor forcing the bus line from a high state to a low state again.

The falling edges of this synchronization signal are thus dependent on the frequency of the sensor's local clock generator. The control unit measures the period between the two falling edges of the synchronization signal and stores this period. By way of example, this may be a numerical value which is related to the control unit's local clock generator. In this context, it is advantageous that the selected sensor's local clock generator does not need to have the same high frequency of the control unit's local clock generator. The control unit takes the measured period and determines a clock for sampling the data from a selected sensor. After a waiting time, the selected sensor can start transmitting the data signal to the controller.

The sensor can send data signals following transmission of the synchronization signal.

The synchronization signal from the sensor may contain known data for identification as a synchronization signal for the control unit. In this case, the sensor can encode the synchronization signal using a particular bit pattern, so that the control unit identifies the received signal as a synchronization signal.

The method for determining a clock for a sensor may be in a form such that the sensor does not send a synchronization signal following every data request by an address signal or by a wake-up signal. By way of example, the sensor can send the synchronization signal only every second, third or fourth time. The control unit uses. The clock for sampling the data in the sensor signal is determined using the stored clock value.

The sensor can send the synchronization signal following reception of the address signal.

The control unit can interrupt the transmission of the data from the sensor following determination of the clock and can send data signals to the sensor following interruption of the transmission, wherein the data signals are dependent on the clock which is determined by reception of the synchronization signal from the selected sensor.

If the control unit has measured the clock of a sensor, during a preceding data transmission, the control unit can interrupt the transmission of the data signals from the selected sensor and can transmit to the sensor a data signal whose data are dependent on the measured clock, that is to say using the clock from a sensor's local clock generator. It is therefore not necessary for a selected sensor's local clock generator to have a low tolerance. This method allows bidirectional data transmission.

The control unit can interrupt the transmission of the synchronization signal from a sensor and can send data signals to the sensor following interruption of the transmission, wherein the data signals are dependent on the clock which is determined by storage of the clock value from a preceding data transmission from the sensor.

When the control unit has received a synchronization signal at least once from a transmitter, the control unit essentially knows the local clock of a sensor. This essentially means that the tolerances of a sensor's local clock generator, which come from the production or technology of the sensor, are known. The variations in the clock, which stem from the environment of the sensor, such as temperature or pressure, remain. Assuming that temperature and pressure or other interfering influences do not change substantially in a particular period, the control unit can therefore also interrupt the synchronization signal from the sensor in order to transmit a data signal to the selected sensor, since the sensor's local clock is known with sufficient accuracy.

The control unit can send more than one or all sensors data, or a general message (broadcast message) or a configuration command, if a specific address signal is used which selects a plurality of or all sensors. A sensor may be in a form such that the sensor is immediately ready to receive data signals following identification of the specific address signal.

A sensor can interrupt the transmission of its synchronization signal if the sensor detects activities by other subscribers on the bus. The control unit can interrupt the transmission of the synchronization signal with its own activities, or other sensors interrupt the transmission of the synchronization signal by sending their own synchronization signal. Following interruption of the transmission of the synchronization signals, the control unit sends data signals, e.g. for transmitting configuration commands or general messages.

The control unit can transmit the data signals with a default clock, which is in a form such that all tolerances of the selected sensors are taken into account. When the control unit has received a synchronization signal at least once from every connected sensor and the clock values of every sensor are known, the control unit can send the general message with a clock which is dependent on the clock values, so that a clock which is optimum for all sensors is obtained.

The data signals may be pulse-width modulated By way of 30 example, the data can be encoded by virtue of the period duration of a clock being known and the pulse length of a high or low signal being varied. The address signal may be pulse-width modulated.

A sensor can be selected on the basis of the duration of the address signal.

The signals from the control unit and from the sensors may be ORed on a bus line. The signals on the bus line can be ORed by virtue of the signal line being connected to a positive supply voltage using a resistor, for example. The control unit and the sensors merely have one transistor, whose drain or collector is connected to the bus line, for actuating the bus line. If none of the transistors, sensors or the control unit is actuated, the bus line is in a high state. As soon as at least one transistor in a sensor or in the control unit actuates the transistor, the bus line is in a low state. This state does not change if a further transistor in a sensor or in the control unit is actuated. This means that, by way of example, the control unit is easily able to actuate the transistor in the control unit in order to interrupt the data transmission of a sensor by virtue of the control unit actuating the transistor in the control unit. All signals can be sent to a bus line.

A control unit comprises a transmitter for sending signals to a sensor, a receiver for receiving signals from the sensor, a timing circuit for measuring a period for a synchronization signal from the sensor, wherein the timing circuit measures the period between a first edge and a second edge of the synchronization signal, wherein both edges are either rising or falling, and a sampling circuit for sampling a signal to be received on the basis of the clock.

The transmitter in the control unit may be designed to send signals to a sensor, wherein the signals are dependent on the clock which is determined by reception of the synchronization 35 signal from the selected sensor.

The transmitter may have a transistor whose collector or whose drain is connected to a bus line for sending a signal.

A sensor comprises a transmitter for sending signals to a control unit, a receiver for receiving signals from the control unit, a clock generator for generating a clock, wherein the transmitter sends a synchronization signal on the basis of the clock, wherein a period between a first edge and a second edge is dependent on the clock and wherein both edges are either rising or falling.

The transmitter may have a transistor whose collector or whose drain is connected to a bus line for sending a signal.

The receiver in the sensor can decode the intervals of time between two received edges on the basis of its own clock.

FIG. 1 shows an exemplary embodiment of an arrangement having a controller 110, two sensors 120, a bus line 180 and two supply lines 181 and 182 for applying a supply voltage.

The control unit 110 communicates with the sensors 120 via the bus line 180. The bus line 180 is connected to a supply potential 182 using a resistor 190. The sensors 120 and the control unit 110 contain transistors 111 which pull the bus line 180 to the supply line 181 when one of the transistors 111 is actuated. The bus line 180 may also be in the form of a two-wire line in order to improve transmission reliability. By way of example, the two data lines can then be connected to a resistor and pulled to the respective supply voltages by two transistors. To improve the line characteristics and to suppress interference, the bus line 180 can be connected by means of capacitors 192 to the respective supply lines 182 and 181 at the inputs of the sensors 120 or at the inputs of the control unit 110.

FIG. 2 shows a typical signal on the bus line 180. 212 identifies a time at which the control unit uses an address signal to trigger a request for data transmission to a sensor. On account of the characteristics of the transistor 111, the signal is impressed onto the bus line only after a certain delay. This delay, latency, is identified by 210 in the figure. The trigger threshold for a sensor may be at a level which is identified by 214, for example. When a control unit has cancelled the trigger signal again, the selected sensor starts to transmit the synchronization signal at the time 218. By way of example, the falling edge of the synchronization signal can be identified by the control unit at a threshold 212. After a certain time, the selected sensor 120 cancels the signal again so as then to apply the signal again at a time 219. When the falling edge has crossed a threshold 220, the control unit detects the period between the first and the second edge. This synchronization phase is identified by 310 in the graph. Using the time 310 measured by the control unit, the control unit calculates the clock which the selected sensor uses for transmitting the further data signals 320. When determining the period of the synchronization signal 310, it is not critical which edge is falling in the signal impressed by the selected sensor 120 or at which threshold 220 the control unit 110 detects the falling edges.

FIG. 3 shows an exemplary embodiment of a method for determining the clock, in which the address signal 340 is a simple short pulse. In this case, reference is made to a wake-up signal. Such a method can be applied when only one sensor and a control unit are connected to the bus line. The period 311 identifies the period in which a sensor 120 sends a synchronization signal. The time range 310 identifies the range in which the control unit 110 receives and evaluates the synchronization signal. The time range 321 identifies the range in which a selected sensor sends a data signal. The period 320 identifies the range in which the control unit receives the data signal from the selected sensor.

The curve in FIG. 4 is used to explain another exemplary embodiment. The signal in the period 330 in FIG. 4 shows an exemplary embodiment of a PWM-encoded address signal. What are shown are a rising edge 334 (shown in a solid line) and two rising edges 332, 333 (shown in dashed lines). The control unit 110 starts the request for data transmission to a sensor by pulling the bus line 180 to a low potential. Depending on whether a first, a second or a third sensor 120 is intended to be chosen, the edge rises again at an earlier or later time, which are identified in FIG. 4 by the identifiers 332, 333 and 334. When the address signal has expired, the selected transmitter 120 undertakes control of the bus by forcing the bus to a low potential. In this case too, the phase 310 or 311 identifies the synchronization signal. Following completion of the synchronization signal 310, 311, the selected sensor 120 starts to transmit the data signal 320, 321.

FIG. 5 shows further exemplary embodiments using a curve. The control unit 110 starts a request for data transmission using address signal 330, which is encoded as PWM in this exemplary embodiment, the possible edges 332, 333 and 334 identifying the addresses of three sensors 120 which are to be selected. When the address signal has expired, the selected sensor 120 starts by virtue of the selected sensor 120 sending the synchronization signal 310. In this exemplary embodiment, the control unit 120 interrupts the synchronization signal before it has expired by virtue of the control unit 120 sending data 370 to the selected sensor 120. The selected sensor identifies from a falling edge of the transmitted signal 370 that the transmission of the synchronization signal has been interrupted, and switches to reception in order to receive the data signals from the control unit 110.

The invention claimed is:
1. A sensor comprising:
a clock generator configured to generate a clock within the sensor;
a receiver within the sensor that is configured to receive a signal from a controller separate from the sensor; and
a transmitter within the sensor that is configured to send a synchronization signal to the controller in response to the signal from the controller, the synchronization signal being based on the clock, and wherein a period between a first edge and a second edge of the synchronization signal is dependent on the clock and both edges are either rising or falling.

2. A sensor system, comprising:
a sensor having a clock generator configured to generate a clock signal within the sensor; and
a controller coupled to the sensor by way of a bus line, the controller configured to change a signal on the bus from a first state to a second state to generate a trigger signal, wherein the sensor is configured to:
    change the signal from the second state to the first state based on the trigger signal,
    generate a synchronization signal based on the clock signal and the change of the signal from the second state to the first state, and
    provide the synchronization signal to the controller via the bus.

3. The sensor system according to claim 2, wherein the signal is at low state in the first state.

4. The sensor system according to claim 2, wherein the signal is at a high state in the second state.

5. The sensor system according to claim 2, wherein the signal is at low state in the first state and a high state in the second state.

6. The sensor system according to claim 2, wherein the sensor is configured to change the signal from the first state to the second state and to terminate the synchronization signal after the signal change from the first state to the second state.

7. The sensor system according to claim 6, wherein the signal is at a low state in the first state.

8. The sensor system according to claim 6, wherein the signal is at high state in the second state.

9. The sensor system according to claim 6, wherein the signal is at low state in the first state and high state in the second state.

10. The sensor system according to claim 2, wherein a length of the synchronization signal is dependent on a frequency of the clock signal.

11. The sensor system according to claim 2, wherein the signal is on the bus line.

12. The sensor system according to claim 2, wherein the sensor changes the signal from the second state to the first state after a delay period.

13. The sensor system according to claim 2, wherein the controller is configured to request a transmission by changing the signal from the second state to the first state and thereafter change the signal from the second state to the first state.

14. A method for establishing a communication between a controller and sensor, comprising:
    changing, by the controller, a signal from a first state to a second state to generate a trigger signal, the signal being associated with a bus line coupled between the controller and the sensor;
    changing, by the sensor, the signal from the second state to the first state based on the trigger signal;
    generating, by the sensor, a clock signal within the sensor; and
    generating, by the sensor, a synchronization signal based on the clock signal and the changing of the signal from the second state to the first state by the sensor.

15. The method according to claim 14, further comprising requesting a transmission by changing the signal from the second state to the first state; and subsequently changing the signal from the second state to the first state.

16. The method according to claim 14, wherein the signal is at low state in the first state and a high state in the second state.

17. The method according to claim 14, further comprising changing the signal from the first state to the second state; and terminating the synchronization signal after the signal change from the first state to the second state.

18. The method according to claim 14, wherein a length of the synchronization signal is dependent on a frequency of the clock signal.

19. The method according to claim 17, wherein the changing the signal from the second state to the first state occurs after a delay.

* * * * *

UNITED STATES PATENT AND TRADEMARK OFFICE
CERTIFICATE OF CORRECTION

| | | |
|---|---|---|
| PATENT NO. | : 9,444,613 B2 | |
| APPLICATION NO. | : 14/612227 | |
| DATED | : September 13, 2016 | |
| INVENTOR(S) | : Dirk Hammerschmidt et al. | |

It is certified that error appears in the above-identified patent and that said Letters Patent is hereby corrected as shown below:

On the Title Page

Under Item (72) INVENTORS, please insert:
-- Wolfgang Scherr, Villach (AT) --, therefor.

Signed and Sealed this
Fourth Day of April, 2023

Katherine Kelly Vidal
*Director of the United States Patent and Trademark Office*